United States Patent [19]

Sylvia

[11] 4,439,667
[45] Mar. 27, 1984

[54] DESOLDERING DEVICE AND IMPROVED HEATER ASSEMBLY THEREFOR

[75] Inventor: Frank Sylvia, Columbia, Md.

[73] Assignee: Pace Incorporated, Laurel, Md.

[21] Appl. No.: 168,804

[22] Filed: Jul. 11, 1980

[51] Int. Cl.³ .......................... H05B 3/02; B23K 3/04
[52] U.S. Cl. ...................................... 219/230; 15/344;
174/50.57; 174/77 R; 219/236; 219/238;
228/51; 338/274; 338/302
[58] Field of Search ...................... 219/230, 236–238;
228/20, 51–55; 174/50.57, 50.6, 77 R; 15/344;
338/274, 302

[56] References Cited
U.S. PATENT DOCUMENTS

| 1,819,671 | 8/1931 | Buccola | 228/53 |
| 2,758,149 | 8/1956 | Brennan | 174/50.57 |
| 4,225,076 | 9/1980 | Litt et al. | 219/230 X |
| 4,269,343 | 5/1981 | Siegel et al. | 228/20 |
| 4,328,920 | 5/1982 | Vella | 219/230 X |

Primary Examiner—A. Bartis
Attorney, Agent, or Firm—Gerald J. Ferguson, Jr.; Joseph J. Baker

[57] ABSTRACT

A suction-type desoldering device includes an elongated tubular heater assembly secured to the forward end of a hollow handle by a radial flange on the assembly. A removable solder collecting chamber adapted to have a vacuum created therein is disposed within the handle and has an open end connected in solder flow communication with the heater assembly by means of a compressible sealing member disposed between the flange and the open end of the chamber. The heater assembly includes a tubular sleeve secured to and extending through the flange adjacent the seal. A tubular support having a length of electric resistance heating wire wrapped therearound is mounted coaxially within and spaced from the tubular sleeve and has one end thereof extending freely into the collection chamber and the other end thereof receiving a removable tubular desoldering tip. Wires connecting the heating wire to a source of electrical energy pass through an opening in the sleeve communicating with a radial groove in the surface of the sealing member engaging the flange. The seal is compressed by biasing means in the handle to such an extent that the groove closes tightly about the connecting wires to block the passage of air through the groove into the heater assembly and collection chamber.

21 Claims, 5 Drawing Figures

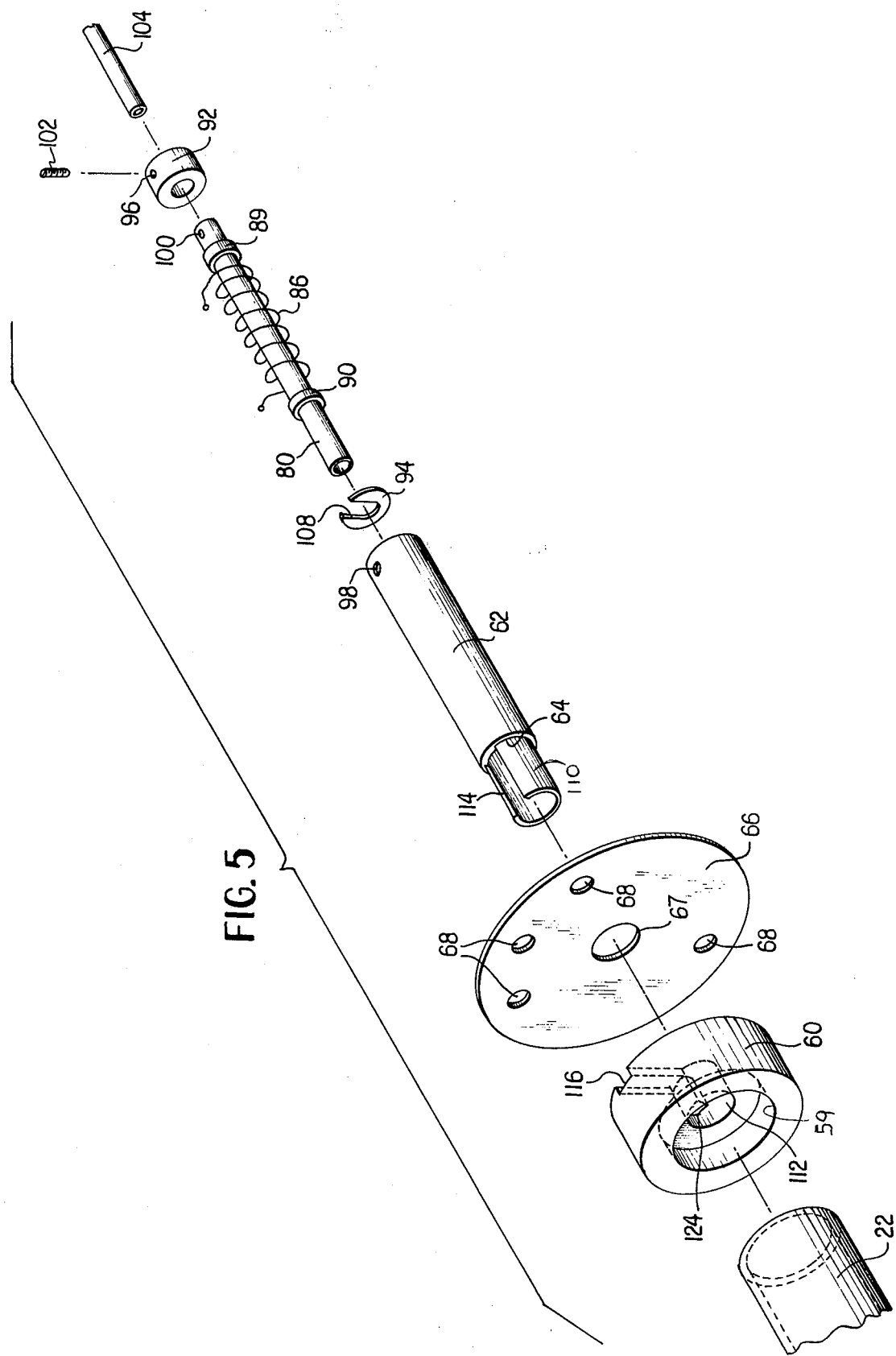

DESOLDERING DEVICE AND IMPROVED HEATER ASSEMBLY THEREFOR

BACKGROUND AND OBJECTS OF THE INVENTION

This invention relates to desoldering devices and more specifically to an improved heater assembly for use therewith.

To effectively join a removable solder collection chamber to a heated tubular support for a desoldering tip has been a recognized problem in the design and manufacture of such devices for some time. This is primarily due to the fact that the collection chamber must be removable for emptying and cleaning yet sealingly engage the end of the heated tubular support in order to ensure that no air enters to disrupt or diminish the effect of the vacuum present in the collection chamber. The sealing element between the collection chamber and heated tubular support is thus usually made of an elastomeric material. As a result of the intense heat generated throughout the length of the tubular support, including the portion thereof adjacent the seal, the seal rapidly deteriorates with the resultant loss of vacuum and ineffective operation of the device.

In addition, designs of the prior art normally encase the heating wire, after it has been wound on a tubular support, with an electrical insulating material of, for example, the ceramic type. This ceramic material which is heat conductive usually extends to a protective sleeve enclosing the heating wire thereby transmitting much of the heat generated to the protective sleeve where it is wastefully dissipated or the heat is so intense that personal injury or property damage results from burns.

The above-described disadvantages of the devices of the prior art are overcome by the unique design of the desoldering device and heating assembly of the present invention. Specifically, the seal in applicant's device is positioned between the solder collection chamber and a flange member which not only serves to mount the heater assembly on the handle of the device but also acts as a radiator for dissipating heat from the protective sleeve of the heater assembly itself. Also, and more importantly, since the tubular support for the heated wire extends into the solder collection chamber without being in contact with the seal itself, only a small portion of the protective sleeve and support flange are in contact with the seal. In addition, the area between the heated tubular support, the heater wire and the protective sleeve is not occupied by a heat conductive material but is in fact open. Because air is a poor conductor of heat, less heat is transmitted to the protective sleeve and thus more is retained in the area of the tubular support resulting in a more efficiently operating device. Further, the protective sleeve is made of a metal such as low heat conductive stainless steel thus a significantly reduced amount of heat is transmitted to the seal resulting in less heat related deterioration thereof.

It is therefore the primary object of the present invention to provide a novel desoldering device characterized by an improved heater assembly.

It is another object of the present invention to provide a desoldering device whose unique design effectively reduces heat related deterioration of sealing elements.

It is yet another object of the present invention to provide an improved heater assembly for a desoldering device which is more efficient in its operation and less likely to cause damage due to excessive heat build-up on exterior structural surfaces.

It is a further object of the present invention to provide a desoldering device which is simple in construction thus more economical to manufacture, use and maintain than prior art devices.

Other advantages structural and operational aspects of the solder extractor of the present invention will become more apparent from the detailed description thereof which follows.

BRIEF DESCRIPTION OF THE DRAWINGS

FIG. 5 is a perspective view of the elements of the heater assembly in their disassembled form.

DETAILED DESCRIPTION OF PREFERRED EMBODIMENT

Figure 1:
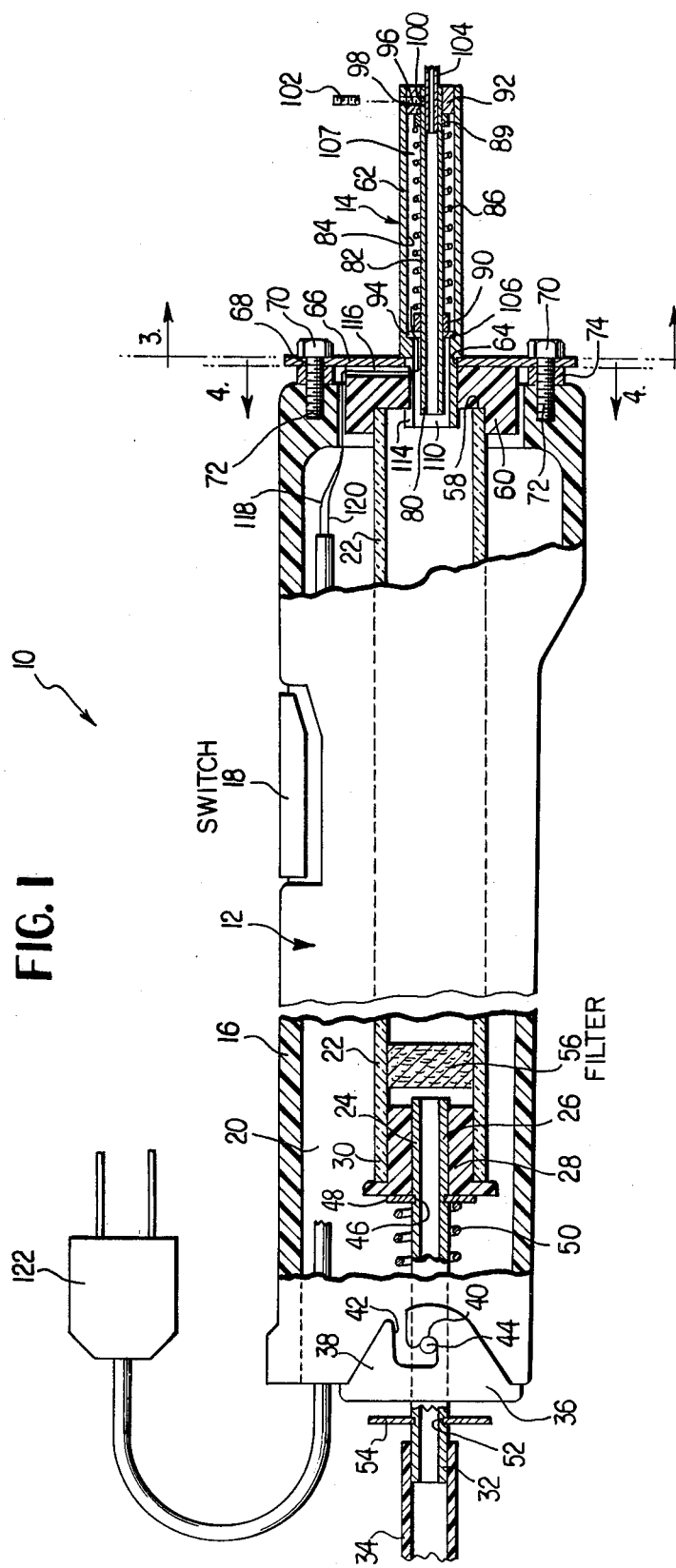
FIG. 1 is a side elevational view of the desoldering device with portions thereof in cross-section.
Figure 3:
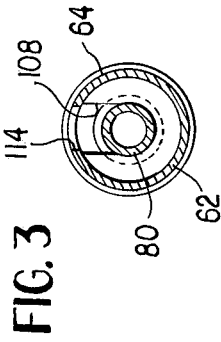
FIG. 3 is a cross-sectional view taken along the lines 3—3 of FIG. 1.
Figure 4:
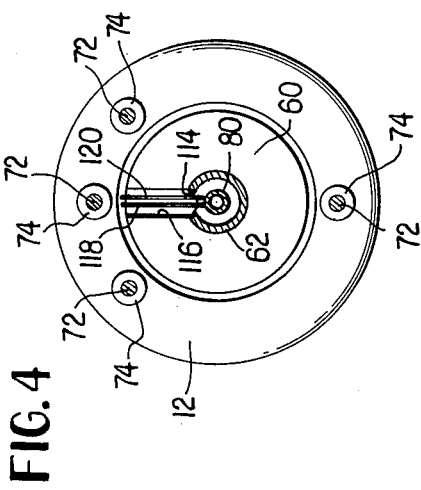
FIG. 4 is a cross-sectional view taken along the lines 4—4 of FIG. 1.
Figure 2:
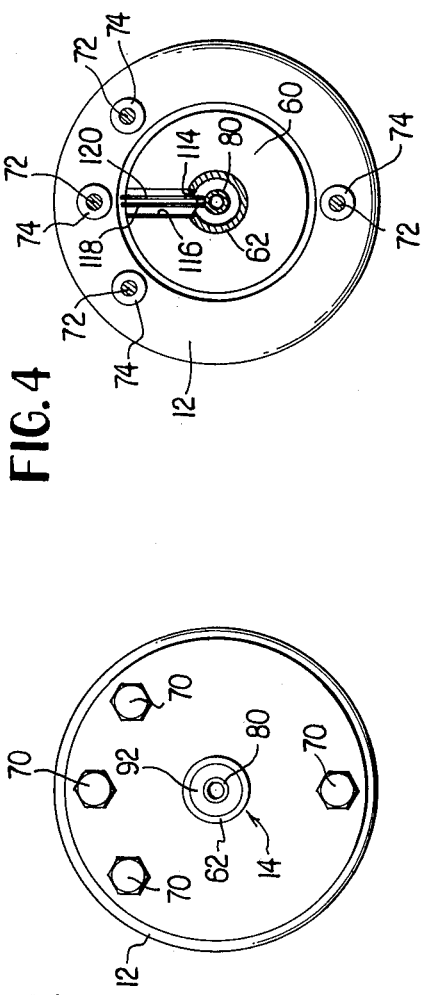
FIG. 2 is an end view of the heater assembly.

Referring now to the drawings where like characters of reference refer to similar elements in each of the several views, it may be seen that the desoldering tool 10 comprises a handle portion 12 and a heater assembly 14.

The handle portion 12 has a housing 16 which is shaped to provide a comfortable feel when held in the hand. An electric switch 18 is also formed in the housing 16 for actuation by the hand of the user. The handle portion 12 has a substantially hollow interior 20 which contains a removable solder collection chamber 22 made of glass or the like. A vacuum tube 24 has one end thereof 26 positioned in a plug 28 which in turn is in frictional, sealing engagement with one end 30 of the solder collection chamber 22. The other end 32 of the vacuum tube 24 is connected to a hose 34 from a vacuum source (not shown). The vacuum tube 24 extends through an end cap 36 of the handle 12. The end cap 36 has spaced apart legs 38 which have the ends thereof fashioned in the shape of a hook 40 at the end of a channel 42. A retainer pin or protuberance 44 is secured to or integrally formed with the housing 16 on both sides thereof. During assembly, after the solder collection chamber 22 has been inserted in the housing interior 20, the retainer pins 44 are permitted to pass through channels 42 in legs 38. The retainer pins 44 are caused to be held in hook portion 40 upon a slight counterclockwise rotation of end cap 36.

A first groove 46 is provided in vacuum tube 24 adjacent the end of plug 28 and a ring 48 is positioned in the first groove to limit the extent of travel of end 26 into the plug 28. A compression spring 50 is positioned on the vacuum tube 24 and it serves to bias the solder collection chamber 22 to the right as viewed in FIG. 1. In addition, the spring 50 simultaneously maintains the retainer pin 44 in the hook 40. A second groove 52 in vacuum tube 24 has a ring 54 positioned in the second groove to prevent end cap 36 from coming off of the vacuum tube 24 under the influence of spring 50 when the end cap 36 is unattached to the housing 16. A cylindrical shaped mass of filter material 56 is provided within and adjacent the end 30 of the solder collection chamber 22 to prevent particles of solder, flux or other debris from being sucked back to the vacuum source (not shown) via hose 34. The other end 58 of solder collection chamber 22 fits into a cylindrical shaped recess 59 of a seal 60 which is made out of an elastomeric material such as rubber or the like and which will be described in greater detail later in conjunction with its relationship with heater assembly 14.

Heater assembly 14 comprises a cylindrical-shaped tubular sleeve 62 made out of a low heat conductive metal such as stainless steel. The tubular sleeve 62 has a circumferential shoulder 64 on the exterior thereof for mounting a disc-shaped flange 66 at right angles thereto. The flange 66 has a plurality of holes 68 through which bolts 70 are inserted. The bolts 70 are then screwed into threaded apertures 72 in the forward portion of the housing 16 to thereby mount the tubular sleeve 62 and the remainder of the heater assembly on the handle portion 12. Spacers 74 may be placed over the bolts 70 adjacent the flange 66 to provide the desired spacing of the flange relative to the handle portion 12. The flange 66 also effectively serves as a radiator for dissipating heat conducted thereto from the tubular sleeve 62.

A bobbin or tubular heating wire support 80 is located within and concentric with the tubular sleeve 62. The tubular wire support 80 is made of a metal such as stainless steel. The outer surface 82 of the wire support as well as the inner surface 84 of the tubular sleeve 62 may be provided with a thin coating of a ceramic material having high electrical insulating properties. A length of heat generating type wire 86 is wound on a predetermined length of the tubular wire support 80. First and second spaced apart collars 89, 90, respectively, are secured on or integrally formed with the tubular wire support 80 and are located adjacent the ends of the wound heating wire 86. Forward and rearward spacers 92,94, respectively, are positioned on the tubular wire support 80 adjacent first and second collars 89,90 respectively. The spacers 92,94 maintain the tubular wire support 80 in the aforementioned concentric and spaced from relationship with tubular sleeve 62.

The forward spacer 92 has a threaded aperture 96 through a side thereof which is in registry with an aperture 98 in the tubular sleeve 62 and an aperture 100 in tubular wire support 80. A threaded set-type screw 102 is then inserted into threaded aperture 96 and into engagement with a tubular shaped tip 104 inserted into tubular wire support 80 to thereby hold same. The inner surface 84 of tubular sleeve 62 has a radially extending shoulder 106 which serves as a stop against which rearward spacer 94 can rest. A slight swaging of the end of the tubular sleeve 62 over the forward spacer 92 is all that is necessary to hold all of the elements 80, 86,89, 90, 92 and 94 of the heater assembly within the tubular sleeve 62. The rearward spacer 94 has an aperture 108 therethrough which permits communication with the space 107 between the outer and inner surfaces 82,84, respectively, adjacent the heating wire 86.

The tubular sleeve 62 has an end portion 110 which extends through a central hole 67 in flange 66 and an aperture 112 in seal 60 into solder collection chamber 22. The tubular sleeve 62 also has an open-ended slot 114 extending inwardly from an end thereof to a point adjacent flange 66 and the seal 60 has a radially extending groove 116 formed in the face thereof positioned opposite flange 66 for the purpose which will now be described. The heater wire 86 has the ends thereof connected to two electrical wires 118, 120 at a point within the space 107. The electrical wires 118, 120 then pass through aperture 108 in rearward spacer 94, through slot 114 in end portion 110 and in groove 116 to the interior 20 of the housing 16. The electrical wires 118,120 are then connected to the electrical service cable terminating plug 122 via switch 18.

As can be seen, the spring 50 biases the solder collection chamber 22 and associated seal 60 into sealing engagement with the surface of flange 66. This spring force exerted on seal 60 tends to cause the groove 116 formed therein to close around electrical wires 118,120 as they pass therethrough to substantially block the passage of air from outside of the device into the solder collection chamber 22 via slot 114 thereby preventing disruption or reduction of the effective operation of the device. If additional sealing is necessary, the space adjacent the electrical wires 118, 120 in the groove 116 can be packed to further reduce the chances of air leakage.

As can readily be seen by this unique construction of applicant's heater assembly 14, the heated tubular wire support 80 is spaced from and out of contact with the seal 60 thus eliminating or greatly reducing the possibility of any heat related damage to the seal 60. In addition, because of the effective sealing achieved between the seal 60 and the other end 58 of the solder collection chamber and the seal 60 and the flange 66, the sides of aperture 112 need not be in contact with end portion 110 of tubular sleeve 62 further reducing the amount of heat reaching seal 60 and thereby prolonging its life. The seal 60 can be provided with a radially extending projection 124 which can fit into recess 114 to thereby center the seal 60 on the tubular sleeve 62 and prevent its rotation with respect thereto.

Prior to actual operation of the device 10 to perform a desoldering operation, an empty solder collection chamber 22 is positioned at one end on plug 28. The other end of the solder collection chamber 22 is inserted into the housing interior 20 and then into recess 59 in seal 60. The end cap 36 is then secured by retainer pins 44 in the manner aforementioned. Closure of switch 18 causes the application of a vacuum to the tubular tip 104 via vacuum tube 24, solder collection chamber 22 and tubular wire support 80. This, in turn, will cause molten solder to be drawn into the collection chamber 22 in a well known manner.

What is claimed is:
1. A desolderer comprising:
 a tubular sleeve having external flange means disposed a predetermined distance from one end of the sleeve and wherein the portion of the sleeve between said one end and the flange means defines a seal disposition surface having an opening therein;
 a heating wire disposed within said sleeve;
 a hollow handle having a forward end, said flange means being secured to the forward end of said handle with said portion of the sleeve extending into the handle;
 a tubular solder collector chamber open at one end and disposed within said handle and adapted to have a vacuum created therein;
 a tubular tip heated by the heating wire so that the tip can melt solder;
 means for providing a path for the molten solder from said tip to said solder collection chamber;
 a compressible seal means disposed around said sleeve at said seal disposition surface between said solder collection chamber and said flange means, said seal means including a radially extending groove facing the flange means and communicating with the sleeve opening, said seal means sealing said open end of the tubular solder collection chamber;

means biasing said sealing means into engagement with said flange means; and electrical connecting means for connecting said heating wire to a source of electrical energy outside of said collection chamber, said electrical connecting means extending through the opening in the tubular sleeve and the groove in the seal means as it passes from the inside of said tubular sleeve to the outside of said solder collection chamber, the sealing means being compressed by the biasing to such an extent that the groove closes about the electrical connecting means to block the passage of air therethrough.

2. A desolderer as set forth in claim 1 where said means for providing a path for the molten solder includes a tubular heating wire support means having said heating wire disposed along a predetermined length thereof, and said desolderer includes a forward spacer means disposed between said heating wire support means and said tubular sleeve at one end of said heating wire, and rearward spacer means disposed between said heating wire support means and said tubular sleeve at the other end of said heating wire, a substantially enclosed space for said heating wire being thereby defined by said tubular sleeve, said heating wire support means and said forward and rearward spacer means, said rearward spacer means having an opening therethrough to permit access to said enclosed space by said electrical connecting means.

3. A desolderer as set forth in claim 2 wherein said tubular heating wire support means has spaced-apart, first and second collars thereon and said heating wire is disposed on said support means between said collars.

4. A desolderer as set forth in claim 3 wherein said collars are integrally formed with said support means.

5. A desolderer as set forth in claim 3 wherein said collars are secured to said support means.

6. A desolderer as set forth in claim 3 wherein said tubular sleeve has a circular shoulder on the interior surface thereof, and said rearward spacer means is positioned on said tubular heating wire support means between said interior shoulder and said first collar.

7. A desolderer as set forth in claim 3 wherein said forward spacer means is positioned on said tubular heating wire support means next to said second collar.

8. A desolderer as set forth in claim 1 wherein said biasing means is a spring of sufficient compressive force to ensure airtight sealing engagement between said seal, said flange and said electrical connecting means extending therebetween.

9. A desolderer as set forth in claim 2 wherein said rearward spacer means is substantially U-shaped and said opening therein is disposed between the legs of the U-shape.

10. A desolderer as set forth in claim 2 where said tubular tip extends into said heating wire support means at one end thereof and said desolderer includes means adjacent said one end for maintaining said tip in said support means.

11. A desolderer as set forth in claim 10 wherein said tubular sleeve, said tubular heating wire support means and said forward spacer means each have an aperture therethrough in registry with each other, said aperture in said forward spacer means being threaded and screw means in said threaded aperture of said forward spacer adapted to engage said desoldering tip to maintain said tip in said support means.

12. A desolderer as set forth in claim 2 wherein said tubular sleeve has an end thereof adjacent said forward spacer means, said end being swaged over said forward spacer means to prevent the removal of same from said tubular sleeve.

13. A desolderer as set forth in claim 2 wherein said tubular heating wire support means enters said solder collection chamber out of contact with said seal.

14. A desolderer as in claim 1 wherein said tubular sleeve includes a slot which extends from said one end along said seal disposition surface and where said opening is a portion of said slot.

15. A desolderer as set forth in claim 14 wherein said seal means has a radially extending projection formed therein which engages said slot in said tubular sleeve.

16. A desolderer as in claims 1 or 15 where said seal means is mounted on said seal disposition surface.

17. A desolderer as in claim 1 where said means for providing a path for molten solder includes a tubular heating wire support means having said heating wire disposed along a predetermined length thereof and where the tubular heating wire support means is in communication with said tip at one end thereof and in communication with the tubular solder collection chamber at the other end thereof.

18. A heater assembly for desolderer having a handle with a solder collection chamber disposed therein, said heater assembly comprising:

a tubular sleeve having external flange means adapted to secure the heater assembly to the handle disposed a predetermined distance from one end of the sleeve and wherein the portion of the sleeve between the said one end and the flange defines a seal disposition surface having an opening therein;

a heating wire disposed within said sleeve;

a tubular tip heated by the heating wire so that the tip can melt solder;

means for providing a path for the molten solder from said tip through the tubular sleeve;

a compressible seal means disposed around said sleeve at said seal disposition surface, said seal including a radially extending groove facing the flange means and communicating with the seal opening, said seal means being adapted to engage and seal the forward end of said solder collection chamber; and electrical connecting means for connecting said heating wire to a source of electrical energy, said electrical connecting means extending through the opening in the tubular sleeve and the groove in the seal means as it passes from the inside of said tubular sleeve, said seal means being sufficiently resilient and compressible as to be capable of closing tightly about the connecting means extending through the groove to create an air-tight seal when biased into engagement with the flange means.

19. A heater assembly as in claim 18 where said tubular sleeve includes a slot which extends from said one end along said seal disposition surface and where said opening is a portion of said slot.

20. A heater assembly as set forth in claim 19 wherein said seal means has an axially extending projection formed therein which engages said slot in said tubular sleeve.

21. A heater assembly as in claim 18 where said means for providing a path for molten solder includes a tubular heating wire support means having said heating wire disposed along a predetermined length thereof where the tubular heating wire support means is in communication with said tip at one end thereof.

* * * * *